(No Model.)
W. W. WHITMORE.
TIRE SETTER AND COOLER.
No. 250,608. Patented Dec. 6, 1881.
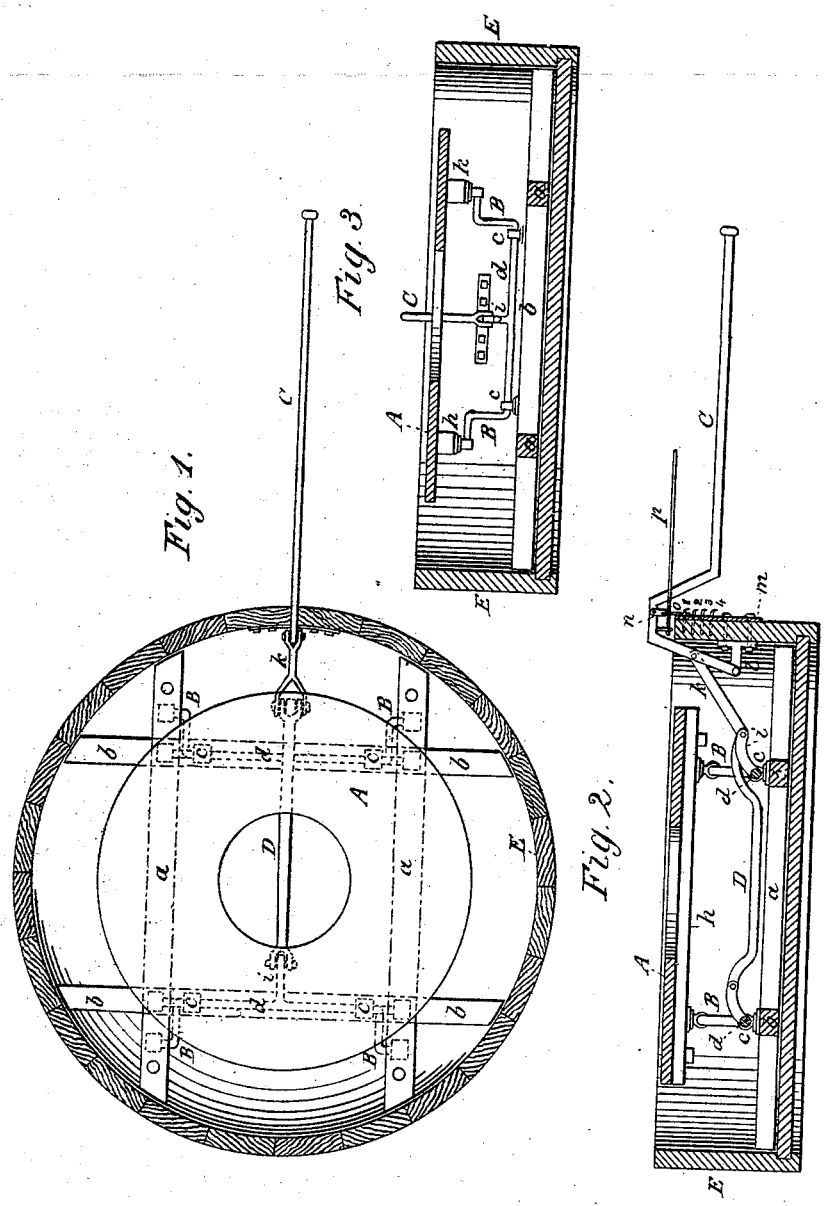
WITNESSES:
Fred. G. Dieterich
John C. Kenon
INVENTOR:
Wm. W. Whitmore
BY
ATTORNEYS.

UNITED STATES PATENT OFFICE.

WILLIAM W. WHITMORE, OF DEFIANCE, OHIO, ASSIGNOR TO HIMSELF AND FRANK J. MAINS, OF SAME PLACE.

TIRE SETTER AND COOLER.

SPECIFICATION forming part of Letters Patent No. 250,608, dated December 6, 1881.

Application filed April 9, 1881. (No model.)

*To all whom it may concern:*

Be it known that I, WILLIAM W. WHITMORE, of Defiance, Defiance county, Ohio, have invented a new and useful Improvement in Tire Setters and Coolers; and I do hereby declare that the following is a full, clear, and exact description of the same, reference being had to the accompanying drawings, forming part of this specification, in which—

Figure 1 is a plan view, and Figs 2 and 3 are vertical sections of Fig. 1.

My invention relates to improvements in that class of tire setters and coolers in which a table carrying a wheel is raised and lowered in a tank containing water to cool and set the tire; and my invention consists in the peculiar construction and arrangement of the parts, as hereinafter more fully set forth.

In the accompanying drawings, E represents a water-tank of larger diameter than that of an ordinary wheel, and provided on the upper face of its bottom with the cross-bars $a\ b$ at right angles to each other, and forming a frame extending across the interior of the tank and resting on its bottom.

$c\ c$ are staples or eyebolts, driven into the parallel beams $b$, their eyes forming journal-bearings for the rock-shafts $d\ d$, each of which is provided at its ends with cranks B, the outer ends of which are pivotally secured to brackets $h$, depending from the lower face of the table A, provided with a central hole for the reception of a wheel-hub the tire of which is to be set and cooled by immersing it in the water contained in the tank.

$i\ i$ are arms, each secured to a rock-shaft, $d$, at its middle, and pivotally connected together by the link D.

$k$ is an upwardly-inclined link, pivotally connected to the link D at one end and similarly connected to the lever C at its opposite end.

$l$ is a stud secured to the inner side face of the tank E, to which the lower end of the lever C is pivoted. The lever C thence extends upward and is bent over or straddles the edge of the tank, and terminates in an arm, horizontal, or nearly so.

$m$ is a plate secured to the outside of the tank near the lever C, and provided with a series of hooks, 1 2 3, &c.

$n\ o$ are connecting-links, the former pivoted to the handle C, and the latter, $o$, provided with a hole adapted to engage with one of hooks 1 2, &c.

$p$ is a rod passing through a staple in the handle C, and secured to one of the connecting-links. The function of the hooks and links is to hold the lever in any desired position when setting tires, and the rod $p$ is employed for detaching the connecting-links from the hooks.

It will be seen that in my construction I dispense with the center post ordinarily employed, and that I am readily enabled by operating the lever to immerse the table and wheel in the water in the tank and hold it in any desired position.

What I claim as my invention is—

The combination, with the tank E and cranks and rock-shafts, as described, for raising and lowering the table, of the bent lever C, pins 1 2 3, links $n\ o$, and rod $p$, for locking said bent lever in any desired position, substantially as specified.

WILLIAM WARREN WHITMORE.

Witnesses:
J. W. SLOUGH,
W. G. BLYMYER.